United States Patent [19]

Geldec

[11] Patent Number: 4,627,525
[45] Date of Patent: Dec. 9, 1986

[54] ELECTROMAGNETIC CLUTCH FOR A DRIVE ASSEMBLY OF A MOTOR VEHICLE

[75] Inventor: Selcuk Geldec, Talheim, Fed. Rep. of Germany

[73] Assignee: Daimler-Benz Aktiengesellschaft, Stuttgart, Fed. Rep. of Germany

[21] Appl. No.: 632,014

[22] Filed: Jul. 18, 1984

[30] Foreign Application Priority Data

Jul. 23, 1983 [DE] Fed. Rep. of Germany ....... 3326686

[51] Int. Cl.⁴ ............................................. F16D 27/10
[52] U.S. Cl. ................................. 192/84 C; 192/103 R
[58] Field of Search ............... 192/84 C, 84 R, 103 R; 310/168, 169, 170; 318/316, 318, 319

[56] References Cited

U.S. PATENT DOCUMENTS

| 3,619,678 | 11/1971 | Ruof | 310/168 |
| 4,295,553 | 10/1981 | Sayo et al. | 192/84 C |
| 4,393,966 | 7/1983 | Kono et al. | 192/103 R X |
| 4,462,491 | 7/1984 | Kono et al. | 192/84 R |
| 4,509,091 | 4/1985 | Booth | 192/84 R X |

FOREIGN PATENT DOCUMENTS

| 1755260 | 1/1972 | Fed. Rep. of Germany . | |
| 2814606 | 10/1979 | Fed. Rep. of Germany . | |
| 3000358 | 7/1980 | Fed. Rep. of Germany . | |
| 63013 | 5/1980 | Japan | 192/103 R |
| 100430 | 7/1980 | Japan | 192/84 C |

Primary Examiner—Rodney H. Bonck
Assistant Examiner—Richard M. Lorence
Attorney, Agent, or Firm—Barnes & Thornburg

[57] ABSTRACT

An electromagnetic clutch for a motor vehicle drive assembly to produce a rotational connection between a rotational drive element and the shaft of the assembly wherein the electromagnetic clutch is also configured to function as a pulse generator for recording the rotational speed of the assembly.

8 Claims, 4 Drawing Figures

ELECTROMAGNETIC CLUTCH FOR A DRIVE ASSEMBLY OF A MOTOR VEHICLE

The invention concerns an electromagnetic clutch for a motor vehicle drive assembly to produce a rotational connection between a rotational drive element, preferably a belt pulley, and the shaft of the assembly, having a stationary excitation device and an anchor plate connected rotationally fixed to the shaft, which anchor plate becomes coupled to the rotational drive element when the excitation device is activated, the excitation device comprising an annular disc-shaped yoke with two ring flanges concentrically arranged, extending at right angles to the yoke and accommodating a coil, and the rotational drive element comprising an annular disc with at least one partition ring surrounding it concentrically with a small air gap between it and the excitation device.

An electromagnetic clutch of this type (German Patent No. 3,000,358) acts to switch on a drive assembly in the vehicle, for example an air conditioning compressor. On activation of the excitation device of the clutch, this arrangement produces a rotational connection to the assembly to be driven via a belt driven by the engine, the belt pulley and the anchor plate, which becomes coupled to the belt pulley on one side and is rotationally solidly connected to the shaft of the assembly on the other. Generally speaking, however, the belt does not just drive one assembly, several assemblies being mutually connected via the belt, for example, the air pump for the exhaust gas purification, the fan, the dynamo/alternator, the lifting assembly or the retarder, it being possible to switch on each assembly by means of its own electromagnetic clutch. In such a drive system, in which the individual drive assemblies are coupled to one another, by a common belt for example, the danger does, however, exist that if one individual drive assembly becomes jammed, the total drive system fails because the belt attempts to continue driving. In order to prevent this, the rotational speed of each drive assembly is monitored so that, in the case of rotational speed deviation, the assembly concerned is brought to rest by timely uncoupling of its electromagnetic clutch. For purposes of rotational speed monitoring, it is known (for example from German Patent No. 2,814,606 and German Patent No. 3,137,177) to locate a so-called generator wheel, usually designed as a gear wheel, on the shaft of the assembly, the generator wheel being opposite to a pulse sensor whose pulses are analyzed in an analysis and control circuit to determine the rotational speed. However, in addition to a central analysis and control circuit achieved in vehicles with electronic ignition control or on-board computer, for example, by extending the control circuit of these elements, the electronic rotational speed measurement requires each assembly to have its own pulse generator, which represents a substantial cost-intensive arrangement. The arrangement (German Patent No. 1,755,260), also known, of monitoring the rotational speed of a shaft using a separate frequency generator consisting of a coil-carrying stator and rotor. does not provide any improvement either with respect to costs or to space requirement.

The objective of the invention is, therefore, to design an electromagnetic coupling of this generic type in such a way that means for rotational speed measurement are employed using readily available components as part of the structure.

This objective is attained, in accordance with the invention, in an electromagnetic clutch of the generic type wherein an excitation device and the rotational drive element of an electromagnetic clutch are also designed to function as a pulse generator, both one ring flange on its external periphery and one partition ring on its inner periphery opposite to the ring flange having tooth-type protrusions and recesses of the same number and distribution aligned in the axial direction.

By this design of the clutch components, namely the excitation device and the rotational drive element to be coupled, the electromagnetic clutch becomes a pulse generator and this, in fact, in the simplest and most cost-effective manner because components, which are present already as part of the structure in any case, are used for this purpose and the formation of the protrusions and recesses is attained by the simplest manufacturing processes, for example by deep drawing, milling, shaping or casting.

These and other objects, features, and advantages of the present invention will become more apparent from the following description when taken in connection with the accompanying drawings which show, for the purposes of illustration only, one embodiment in accordance with the present invention, and wherein.

Figure 1:
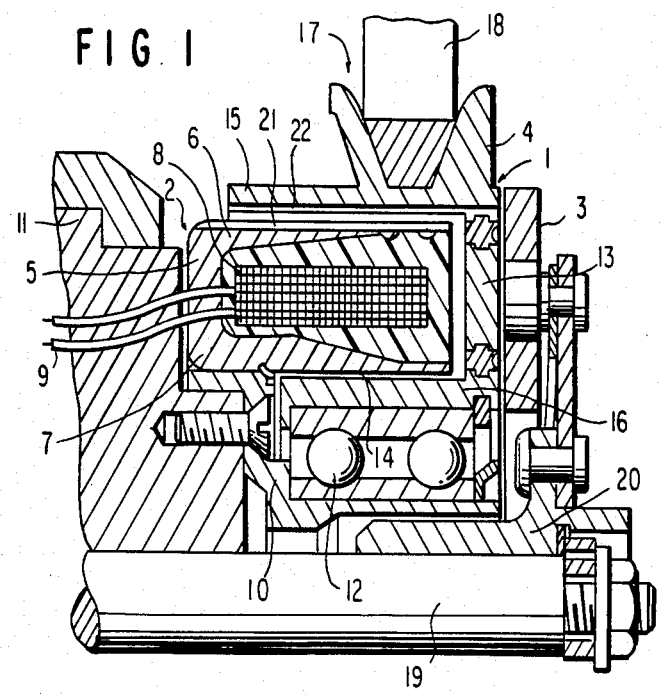
FIG. 1 shows the electromagnetic clutch connection to the shaft of a drive assembly and designed as a pulse generator.

Turning now to the figures wherein like elements are designated by like reference numerals, the electromagnetic clutch 1 shown in FIG. 1 consists essentially of an excitation device 2, an anchor plate or armature 3 and a rotational drive element 4. The stationary excitation device 2 is in turn formed by an annular disc-shaped yoke 5 with two ring flanges 6 and 7 concentrically located and extending in the axial direction at right angles to the yoke 5, which ring flanges 6 and 7 are spaced radially from each other. A coil 8 is laid in the space between the two ring flanges 6 and 7 and cast in with insulation material. The coil 8 is connected to the on-board electricity supply and switching equipment via supply lines 9. The excitation device 2 is solidly fastened to the casing 11 of an assembly by means of a support 10. In addition, a bearing 12, which rotatably supports the rotational drive element 4, is carried on the support 10. The rotational drive element 4 consists of an annular disc 13 with two partition rings 15 and 16 concentrically surrounding, with a small air gap 14, the ring flanges 6 and 7 of the excitation device 2. The partition ring 16 can simultaneously form the bearing hub for the bearing 12. On its periphery, the rotational drive element 4 is provided with a peripheral trapezoidal groove 17 to accept a driving belt 18, whose movement is in turn derived from the vehicle engine. As may be seen from the drawing, the annular disc 13 of the rotational drive element 4 extends parallel to the end faces of the ring flanges 6 and 7 of the excitation device 2 and between them and the anchor plate 3 of the clutch 1, there being a very small air gap between the disc 13 and the anchor plate 3. The anchor plate 3 is, in turn, rotationally solidly connected to the shaft 19 of the assembly via a flange 20, the fastening of the anchor plate 3 onto the flange 20 being, for example by spring support such that the anchor plate 3 can move in the direction of the disc 13 at least by the amount of the air gap.

In accordance with the invention, the ring flange 6 of the excitation device 2, on its external periphery, and the partition ring 15 of the rotational drive element 4, on its internal periphery, have tooth-type protrusions 21 and recesses 22 running in the axial direction and, in fact, evenly distributed around the periphery and with the same number on both parts 6 and 15. The size of the recesses 22 is so chosen that the width of the air gap 14 changes noticeably. Since, generally speaking, the ring flanges 6 and 7 of the yoke 5 and the partition rings 15 and 16 of the rotational drive element 4 are preformed parts, the recesses 22 can be incorporated in the simplest manner during manufacture, for example during casting or deep drawing or by shaping or milling.

Figure 3:
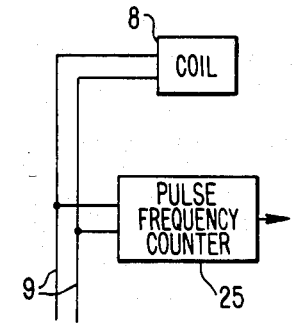
FIG. 3 shows a pulse frequency measurement circuit in accordance with the invention.
Figure 2:
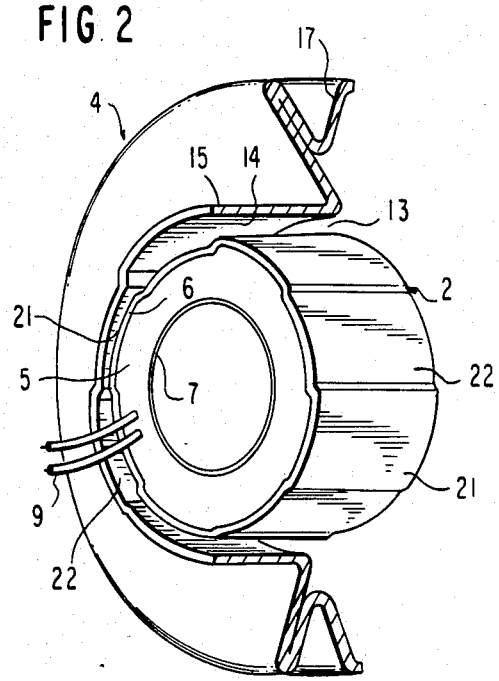
FIG. 2 shows the excitation device and the rotational drive element of the electromagnetic clutch in diagrammatic representation.

The function of the electromagnetic clutch is now as follows:

The rotational drive element 4 is put into rotational movement by the V-belt or toothed belt 18 driven by an engine. If the corresponding drive assembly should or must be switched on to meet requirements, the coil 8 is excited in known manner by means of a control circuit and the excitation device thus activated. Because of this, the anchor plate 3 is attracted and moves axially to close the gap to become coupled to the rotating annular disc 13 of the rotational drive element 4. Since the anchor plate 3 is rotationally solidly connected via the flange 20 to the shaft 19 of the assembly to be driven, the force path for the transmission of the torque from the engine, belt 18, rotational drive element 4, anchor plate 3 and flange 20, to the shaft 19 of the assembly is established. The rotational drive element 4, however, also executes a rotational movement relative to the activated stationary excitation device 2, the rotating protrusions 21 and recesses 22 in the partition ring 15 passing by the stationary protrusions 21 and recesses 22 in the ring flange 6 during this movement. This causes a change to the air gap 14 depending on whether protrusion and protrusion or protrusion and recess are opposite one another and this leads to a pulsating change in the inductivity and hence also to the voltage across the coil 8 and the current flowing through the coil 8. These current pulses are determined by the product of the number of protrusions and the rotational speed of the rotational drive element and they can be measured directly in the coil supply line 9 and transmitted to an analysis circuit or pulse frequency counter 25 of FIG. 3 in which they are evaluated as rotational speed pulses.

As already explained, the size of the recesses 22 is so chosen that the width of the air gap 14 noticeably changes because the amplitude of the pulses results from this. If the analyzed rotational speed pulses now correspond to the required rotational speed of the assembly, there is no interference in the control circuit by the analysis circuit. If, however, the rotational speed of the assembly falls or if the assembly jams, the rotational driving element 4 is also decelerated or brought to rest via the anchor plate 3. In consequence, the pulse series changes or the pulses disappear so that the analysis circuit experiences a deviation of the actual rotational speed from the required rotational speed and, by a signal to the control circuit, activates the latter to switch off the coil excitation and, therefore, to declutch the defective assembly from the rotational drive element. This ensures that the other assemblies driven via the belt 18 are not involved in the failure.

Figure 4:
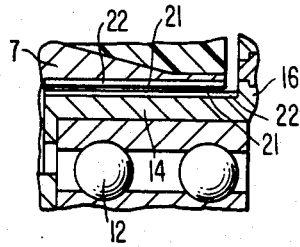
FIG. 4 shows a partial view of a second embodiment of the invention.

As a variation of the embodiment example shown, it is also possible to apply the protrusion 21 and recesses 22 to the ring flange 7 and the partition ring 16 as shown in FIG. 4.

While I have shown and described plural embodiments in accordance with the present invention, it is understood that the same is not limited thereto but is susceptible to numerous changes and modifications as known to one having ordinary skill in the art, and I therefore do not wish to be limited to the details shown and described herein, but intend to cover all such modifications as are encompassed by the scope of the appended claims.

I claim:

1. Electromagnetic clutch for a motor vehicle drive assembly to produce a rotational connection between a rotational drive element and a shaft of the assembly, having a stationary excitation device, and having an armature connected rotationally fixed to the shaft, which armature becomes coupled to the rotational drive element when the excitation device is activated, the excitation device comprising an annular disc-shaped yoke with two ring flanges concentrically arranged, extending substantially at right angles to the yoke and accommodating a coil, the rotational drive element comprising an annular disc with a first partition ring surrounding said excitation device concentrically with a small air gap between said first partition ring and the excitation device, and a second partition ring concentrically disposed within said excitation device with a small air gap therebetween, the excitation device and the rotational drive element of the electromagnetic clutch being configured to function also as a pulse generator, both one ring flange on a periphery thereof and one partition ring on a periphery opposite to the said one ring flange having tooth-type protrusions and recesses of substantially the same number and distribution disposed in an axial direction for generating from said excitation device pulses having a frequency proportional to the rotational speed of the drive element.

2. Electromagnetic clutch in accordance with claim 1, wherein the protrusions and recesses are located on an outer periphery of one of said ring flanges and an inner periphery of said first partition ring.

3. Electromagnetic clutch in accordance with claim 1, wherein the protrusions and recesses are located on an inner periphery of one of said ring flanges and an outer periphery of said second partition ring.

4. Electromagnetic clutch in accordance with claim 1, wherein the protrusions and recesses are produced during shaping of the ring flange and partition ring.

5. Electromagnetic clutch in accordance with claim 1, wherein the protrusions and recesses are produced during machining of the ring flange and partition ring.

6. Electromagnetic clutch in accordance with claim 1, wherein the protrusions and recesses extend over the complete axial length of a ring flange and a partition ring.

7. Electromagnetic clutch in accordance with claim 1, further comprising means for measuring frequency of pulses generated in a supply line to said coil.

8. An electromagnetic clutch for a motor vehicle drive assembly to produce a rotational connection between a rotational drive element and a shaft of the assembly, the shaft having an axis, the clutch having a stationary excitation device and having an armature connected rotationally fixed to the shaft, which armature becomes coupled to the rotational drive element when the excitation drive is activated, the excitation device comprising an annular disc-shaped yoke with two ring flanges concentrically arranged with respect to the yoke, extending substantially at right angles to the yoke, the yoke accommodating a coil, the rotational drive element comprising an annular disc with plural partition rings one of said partition rings surrounding said excitation device concentrically with a small air gap between said one partition ring and the excitation device, one of said ring flanges having protrusions and recesses on its external periphery, and said one partition ring having protrusions and recesses on its inner periphery opposite to the protrusions and recesses of said one ring flange, said protrusions, and recesses of said one partition ring and said one ring flange being disposed axially for generating a pulse output from said coil.

* * * * *